(12) United States Patent
Ohtsuki et al.

(10) Patent No.: US 8,798,983 B2
(45) Date of Patent: Aug. 5, 2014

(54) ADAPTATION FOR STATISTICAL LANGUAGE MODEL

(75) Inventors: Katsutoshi Ohtsuki, Tokyo (JP); Takashi Umeoka, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 1238 days.

(21) Appl. No.: 12/413,606

(22) Filed: Mar. 30, 2009

(65) Prior Publication Data

US 2010/0250251 A1     Sep. 30, 2010

(51) Int. Cl.
*G06F 17/20* (2006.01)
*G06F 17/22* (2006.01)
*G06F 3/023* (2006.01)

(52) U.S. Cl.
CPC .......... *G06F 17/2223* (2013.01); *G06F 3/0237* (2013.01)
USPC .............................................. 704/1

(58) Field of Classification Search
CPC ........................ G06F 17/2223; G06F 3/0237
USPC ................................................. 704/1–9
See application file for complete search history.

(56) References Cited

U.S. PATENT DOCUMENTS

| | | | |
|---|---|---|---|
| 7,013,258 B1 * | 3/2006 | Su et al. ............................. | 704/1 |
| 7,072,826 B1 | 7/2006 | Wakita | |
| 7,103,534 B2 | 9/2006 | Goodman | |
| 7,107,204 B1 * | 9/2006 | Liu et al. ........................... | 704/2 |
| 7,379,870 B1 | 5/2008 | Belvin et al. | |
| 7,406,416 B2 * | 7/2008 | Chelba et al. ................. | 704/240 |
| 7,424,675 B2 | 9/2008 | Lee et al. | |
| 7,478,033 B2 | 1/2009 | Wu et al. | |
| 7,480,612 B2 * | 1/2009 | Mori et al. ........................ | 704/9 |
| 2005/0027534 A1 | 2/2005 | Meurs et al. | |
| 2005/0044495 A1 * | 2/2005 | Lee et al. ....................... | 715/533 |
| 2005/0060138 A1 * | 3/2005 | Wang et al. ....................... | 704/1 |
| 2005/0137868 A1 * | 6/2005 | Epstein et al. ................ | 704/252 |

(Continued)

FOREIGN PATENT DOCUMENTS

| | | |
|---|---|---|
| CN | 1311881 A | 1/2005 |
| CN | 1663265 A | 8/2005 |
| CN | 101034390 A | 9/2007 |
| JP | 2007219385 A | 8/2007 |

OTHER PUBLICATIONS

Tsai Jia-Lin, "Using Word-Pair Identifier to Improve Chinese Input System", Retrieved at <<http://acl.ldc.upenn.edu/l/l05/l05-3002.pdf>>, Published 2006.

(Continued)

*Primary Examiner* — Jialong He
(74) *Attorney, Agent, or Firm* — Steve Crocker; Peter Taylor; Micky Minhas

(57) ABSTRACT

Architecture that suppresses the unexpected appearance of words by applying appropriate restrictions to long-term and short-term memory. The quickness of adaptation is also realized by leveraging the restriction. The architecture includes a history component for processing user input history for conversion of a phonetic string by a conversion process that output conversion results, and an adaptation component for adapting the conversion process to the user input history based on restriction(s) applied to short-term memory that impacts word appearances during the conversion process. The architecture performs probability boosting based on context-dependent probability differences (short-term memory), and dynamic linear-interpolation between long-term memory and baseline language model based on frequency of preceding context of word (long-term memory).

20 Claims, 8 Drawing Sheets

(56) References Cited

U.S. PATENT DOCUMENTS

| | | | |
|---|---|---|---|
| 2006/0173686 A1 | 8/2006 | Hwang | |
| 2008/0040099 A1* | 2/2008 | Wu et al. | 704/9 |
| 2008/0072143 A1 | 3/2008 | Assadollahi | |
| 2008/0193015 A1 | 8/2008 | Hong | |
| 2008/0195388 A1 | 8/2008 | Bower et al. | |
| 2008/0195571 A1 | 8/2008 | Furuuchi et al. | |
| 2008/0319738 A1 | 12/2008 | Liu et al. | |
| 2009/0030687 A1* | 1/2009 | Cerra et al. | 704/243 |
| 2009/0070097 A1* | 3/2009 | Wu et al. | 704/2 |
| 2009/0216690 A1* | 8/2009 | Badger et al. | 706/11 |
| 2010/0217581 A1* | 8/2010 | Hong | 704/3 |
| 2011/0106523 A1* | 5/2011 | Maeda et al. | 704/2 |

OTHER PUBLICATIONS

Gao, et al., "An Empirical Study on Language Model Adaptation", Retrieved at <<http://research.microsoft.com/en-us/um/people/jfgao/paper/gao_suzuki_yuan.2006.talip.pdf>>, Dec. 2005.

Nishimoto, et al., "Intelligent Predictive Text Input System using Japanese Language", Retrieved at <<http://nwanua.aniomagic.com/papers/nlp_elumeze_nishimoto.pdf>>, 2006.

"International Search Report", Mailed Date: Oct. 22, 2010, Application No. PCT/US2010/028932, Filed Date: Mar. 26, 2010, pp. 9.

"Notice on the First China Office Action", Mailed Date: Oct. 17, 2012, Application No. 201080015801.5, Filed Date: Mar. 26, 2010, pp. 9.

\* cited by examiner

ADAPTATION FOR STATISTICAL LANGUAGE MODEL

BACKGROUND

Input methods can be employed to convert phonetic strings (reading) into display characters for East Asian languages such as Chinese, Korean, and Japanese, for example, and also process strokes such as in the Traditional Chinese characters. Ambiguity exists in conversion due to homonyms and various possible word segmentations. An input method tries to solve the ambiguity based on a general (e.g., baseline, default) language model and user input history. Adaptation to the user input history can be performed in several ways, for example, short-term memory and long-term memory. Short-term memory corresponds to the quickness of adaptation, and long-term memory corresponds to the stability of the adaptation. Conversion results are determined by adding information from the short-term and long-term memory to the general language model.

Short-term memory can be implemented by boosting word scores or changing word rank based on a previous user choice of words (user input history). However, some words do not appear soon enough after being used and some words appear unexpectedly in unacceptable contexts after being used. Long-term memory can be implemented by accumulating user input history. However, some words still appear unexpectedly in unacceptable context in spite of the utilization of long-term memory.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture suppresses the unexpected appearance of words by applying appropriate restrictions to long-term and short-term memory. The quickness of adaptation is also realized by leveraging the restriction.

The architecture includes a history component for processing user input history for conversion of a phonetic string by a conversion process that output conversion results, and an adaptation component for adapting the conversion process to the user input history based on restriction(s) applied to short-term memory that impacts word appearances during the conversion process. The architecture performs probability boosting based on context-dependent probability differences (short-term memory), and dynamic linear-interpolation between long-term memory and baseline language model based on frequency of preceding context of word (long-term memory).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
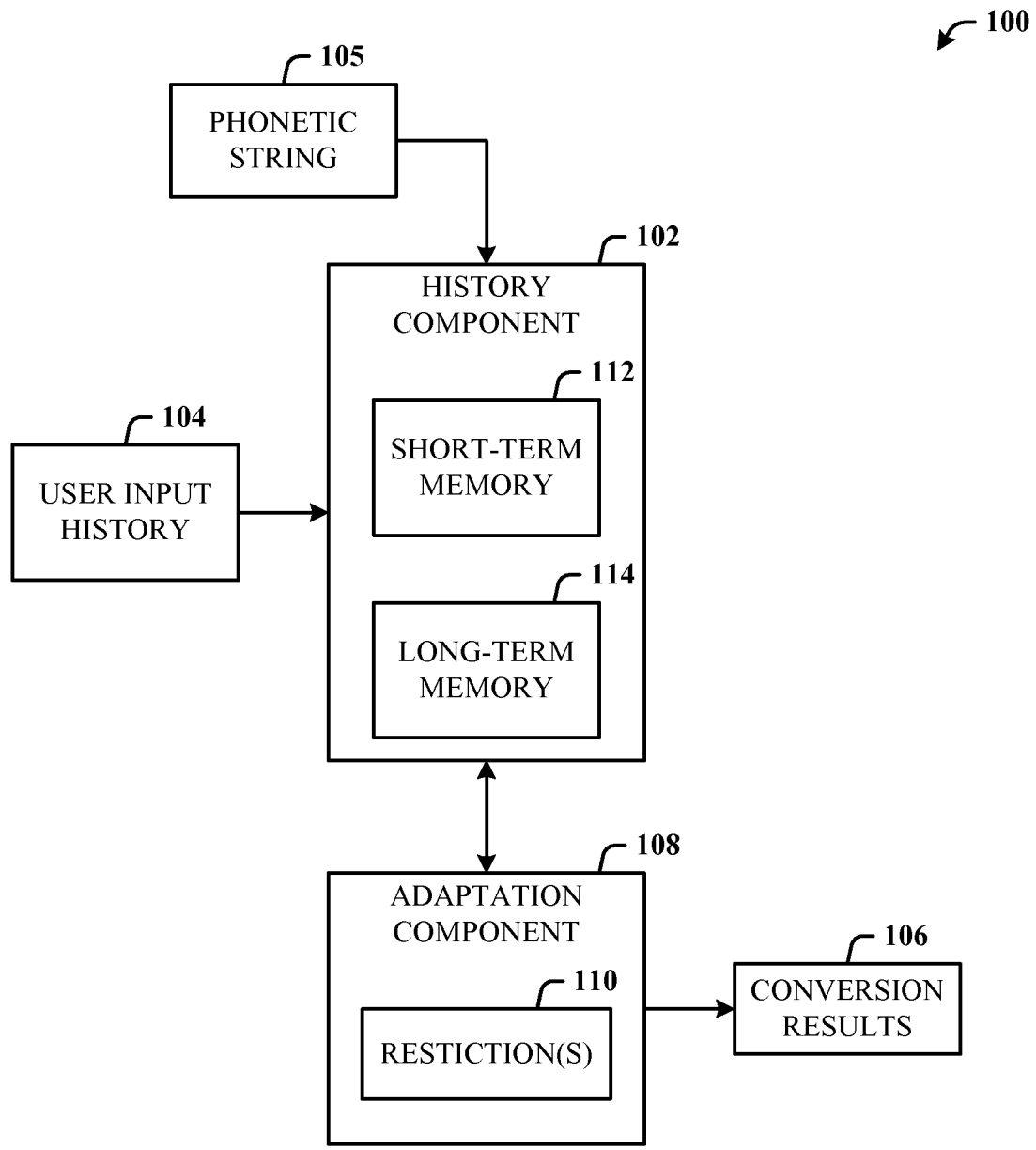
FIG. 1 illustrates a computer-implemented phonetic system in accordance with the disclosed architecture.

Although the conversion accuracy of existing phonetic systems can be high in a general scenario, users are still disappointed because the language space of a specific user is different from the generic space. This is true especially for personal names, and the expression preferences naturally vary according to the users, and thus, cannot be addressed by the generic language model.

The disclosed architecture is a self-tuning technique where the user no longer needs to open a candidate list after using the product for a short period of time (e.g., 2-3 weeks). Moreover, the disclosed self-tuning technique improves a user's work performance. The architecture performs probability boosting based on context-dependent probability differences (short-term memory), and dynamic linear-interpolation between long-term memory and baseline language model based on frequency of preceding context of word (long-term memory).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented phonetic system 100 in accordance with the disclosed architecture. The system 100 includes a history component 102 for processing user input history 104 for conversion of a phonetic string 105 by a conversion process that output conversion results 106, and an adaptation component 108 for adapting the conversion process to the user input history 104 based on restriction(s) 110 applied to short-term memory 112 that impacts word appearances during the conversion process.

The adaptation component 108 performs dynamic linear interpolation between long-term memory 114 and a baseline language model based on long-term memory 114. The restriction(s) 110 boost probability of a word when the word is other than a first candidate of a candidate list. The restriction(s) 110 applied to the short-term memory 112 employs a context-sensitive short-term memory bigram probability. The restriction(s) 110 applied to the short-term memory 112 boost a probability based on a word and a context of the word in a sentence. The context includes a preceding context and a succeeding context relative to the word in the sentence. The adaptation component 108 includes a learning algorithm that performs flag-learning based on a difference between a first candidate of a candidate list and a selected candidate of the candidate list and moves the selected candidate to a first conversion result position in a next conversion process.

Figure 2:
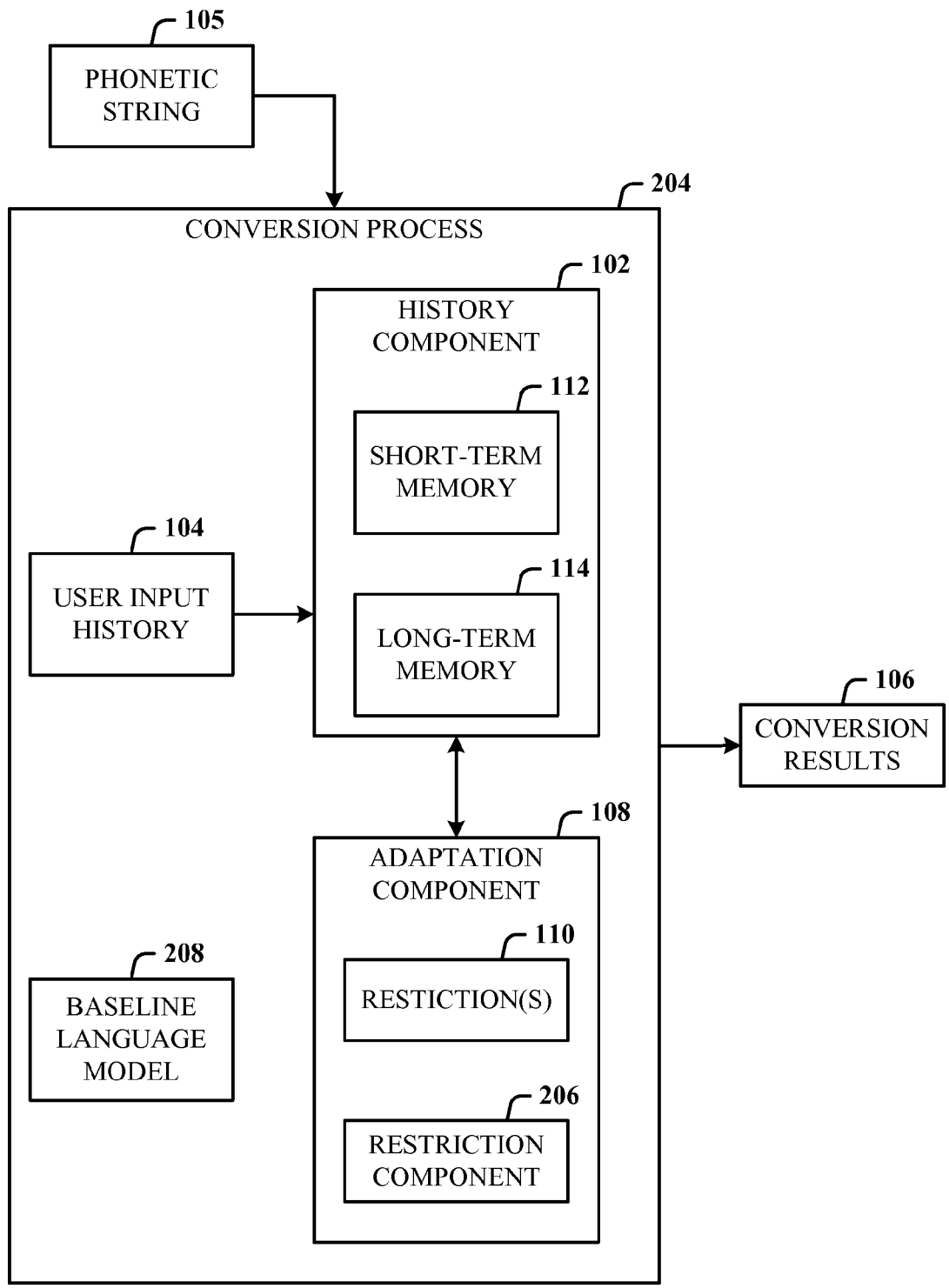
FIG. 2 illustrates a system that includes additional aspects of the phonetic system of FIG. 1.

FIG. 2 illustrates a system 200 that includes additional aspects of the phonetic system 100 of FIG. 1. The system 200 includes the history component 102 for processing the user input history 104 for conversion of the phonetic string 105 by a conversion process 204, and the adaptation component 108 for adapting the conversion process 204 to the user input history 104 based on the restriction(s) 110 applied to the short-term memory 112 that impacts word appearances during the conversion process 204.

The adaptation component 108 performs dynamic linear interpolation between the long-term memory 114 and a baseline language model 208 based on the long-term memory 114. The restriction(s) 110 boost probability of a word when the word is other than a first candidate of a candidate list. The restriction(s) 110 applied to the short-term memory 112 employs a context-sensitive short-term memory bigram probability. The restriction(s) 110 applied to the short-term memory 112 boosts a probability based on a word and a context of the word in a sentence. The context includes a preceding context and a succeeding context relative to the word in the sentence. The adaptation component 108 includes a learning algorithm that performs flag-learning based on a difference between a first candidate of a candidate list and a selected candidate of the candidate list and moves the selected candidate to a first conversion result position in a next conversion process.

The system 200 further comprises a restriction component 206 for applying the restriction(s) 110 by boosting a probability based on context-dependent probability differences. The restriction component 206 can also apply one or more of the restriction(s) 110 to the long-term memory 114 by boosting a probability based on a context-dependent probability difference.

Put another way, the phonetic system 200 includes the history component 102 for processing the user input history 104 for conversion of the phonetic string 105 during the conversion process 204, the restriction component 206 for applying one or more of the restriction(s) 110 to the user input history 104 during the conversion process 204. The history 104 includes the short-term memory 112 and the long-term memory 114. The system 200 also includes the adaptation component 108 for adapting the conversion process 204 to the user input history 104 based on the restriction(s) 110.

The restriction component 206 applies one or more of the restriction(s) 110 to the short-term memory 112. The applied restriction(s) 110 employ a context-sensitive short-term memory bigram probability, and one or more restrictions(s) 110 to the long-term memory 114 that boosts a probability based on a context-dependent probability difference. The adaptation component 108 performs dynamic linear interpolation between the long-term memory 114 and the baseline language model 208 based on the long-term memory 114. The restriction(s) 110 boost probability of a word when the word is other than a first candidate of a candidate list. The restriction(s) 110 applied to the short-term memory 112 boost a probability based on a word and a context of the word in a sentence. The context includes a preceding context and a succeeding context relative to the word in the sentence.

Following is a detail description of the computations employed for fast and stable adaptation for statistical language model.

The input method conversion result for an input phonetic string can be determined by the following probability:

$$P(W) = P(w_1|<s>) \cdot P(w_2|w_1) \cdot P(w_3|w_2) \ldots P(w_N|w_{N-1}) \cdot P(</s>|w_N)$$

where W is a sentence that includes a word sequence $\{w_1, w_2, w_3, \ldots, w_{N-1}, w_N\}$ and, $<s>$ and $</s>$ are symbols for sentence-start and sentence-end, respectively. The equation is for the bigram model, but can be represented with trigram or higher-order n-gram models.

There can be many possible word sequences W for an input phonetic string due to homonyms and ambiguity of word segmentation.

A most probable candidate sentence is selected as a conversion result.

$$\hat{W} = \arg\max_W P(W)$$

The probability for each word can be defined as, $$P(w_n|w_{n-1}) = \alpha \cdot P_{baseline}(w_n|w_{n-1}) + \beta \cdot P_{ltm}(w_n|w_{n-1}) + \delta \cdot P_{stm}(w_n|w_{n-1})$$

where $\alpha$, $\beta$, and $\delta$ are linear interpolation coefficients that sum to one ($\alpha+\beta+\delta=1$), $P_{baseline}(w_k|w_{k-1})$ is a baseline bigram probability estimated from the training text database (when using the input method for the first time, only this probability has a value), $P_{ltm}(w_n|w_{n-1})$ is the bigram probability for the long-term memory, and $P_{stm}(w_n|w_{n-1})$ is the bigram probability for the short-term memory. The bigram probability for the long-term memory can be calculated from the user input history, as follows.

$$P_{ltm}(w_n | w_{n-1}) = \frac{C_{user}(w_{n-1}, w_n)}{C_{user}(w_n)}$$

where $C_{user}(w_n)$ is the number of times the user used the word $w_n$, and $C_{user}(w_{n-1}, w_n)$ is the number of times the user uses the word sequence $w_{n-1}, w_n$.

The bigram probability for short-term memory, $P_{stm}(w_n|w_{n-1})$, boosts the probability for words when the word is not the first candidate of the result, but user selects the word from the candidate list.

$$P_{stm}(w_n | w_{n-1}) = \frac{C_{user-sel}(w_{n-1}, w_n)}{M}$$

where $C_{user-sel}(w_{n-1}, w_n)$ is the number of times that user selects the word sequence $w_{n-1}, w_n$ from the candidate list, and M is the maximum count for selecting. Note that $C_{user-sel}(\cdot)$ cannot exceed M.

The above equation can be generalized by exponentiation, represented as the following:

$$P_{stm}(w_n | w_{n-1}) = \left(\frac{C_{user-sel}(w_{n-1}, w_n)}{M}\right)^k$$

Following is additional description for long-term memory. The linear-interpolation weight $\alpha$ and $\beta$ for a word $w_n$ change depending on $C_{user}(w_{n-1})$. This means the weights differ depending on the previous word.

The target weights $\alpha_{target}$ and $\beta_{target}$ are defined and used when $C_{user}(w_{n-1})$ is sufficiently large. Actual weights $\alpha$ and $\beta$ for $w_n$ can be calculated as follows, $$\beta = \omega \cdot \beta_{target}$$

$$\alpha = \alpha_{target} + \beta_{target} - \beta = \alpha_{target} + (1-\omega) \cdot \beta_{target}$$

$$\omega = \begin{cases} \frac{1}{t} \cdot C_{user}(w_{n-1}) & \text{if } C_{user}(w_{n-1}) < t \\ 1 & \text{Otherwise} \end{cases}$$

Figure 3:
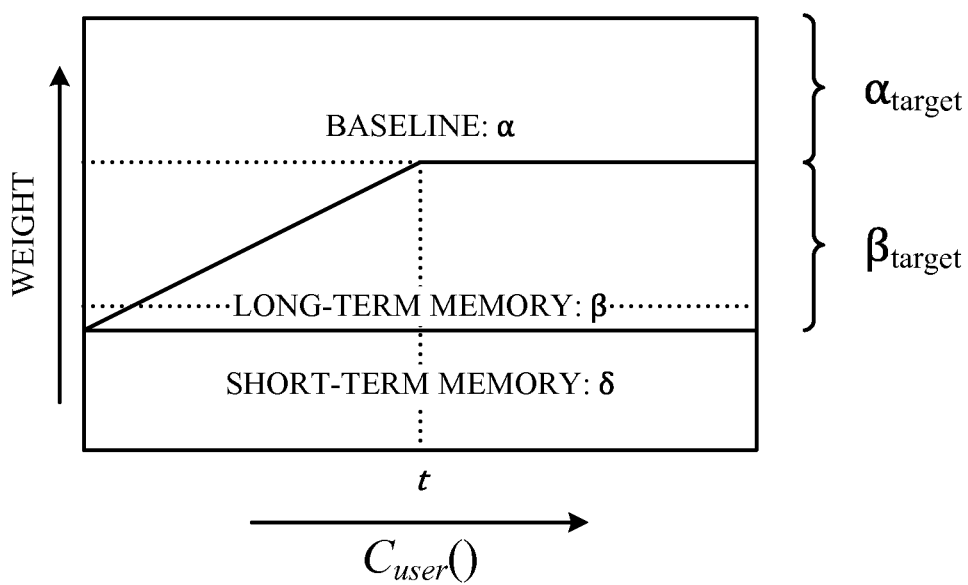
FIG. 3 illustrates a graph for the weights transition.

FIG. 3 illustrates a graph 300 for the weights transition. The graph 300 shows the relative vertical range segments for short term memory $\delta$, long-term memory $\beta$, and baseline $\alpha$, with the long-term memory $\beta$ designated the $\beta_{target}$, and the baseline designated the $\alpha_{target}$. The graph 300 indicates that as the number of times that the word is used increases, at a time t, the weighting for the long-term memory reaches the $\beta_{target}$.

When $C_{user}(w_{n-1})$ is small, the long-term bigram probability tends to be high and yields an unexpected appearance of words. However, this weight-adjustment can suppress these kinds of side-effects.

Following is additional description for short-term memory. Two approaches can be employed, either separately or combined: context-sensitive use of a short-term memory bigram probability, and probability boosting depending on the probability difference.

With respect to the first approach, the context-sensitive use of short-term memory bigram probability, the probability is regarded as zero when the selected-count is zero for the succeeding word sequence.

$$P_{stm}(w_n \mid w_{n-1}) = \begin{cases} \frac{C_{user-sel}(w_{n-1}, w_n)}{M}, & \text{if } C_{user-sel}(w_n, w_{n+1}) > 0 \\ 0 & \text{otherwise} \end{cases}$$

Similar results can be obtained using the preceding word sequence.

$$P_{stm}(w_n \mid w_{n-1}) = \begin{cases} \frac{C_{user-sel}(w_{n-1}, w_n)}{M}, & \text{if } C_{user-sel}(w_{n-2}, w_{n-1}) > 0 \\ 0 & \text{otherwise} \end{cases}$$

These conditions can be varied depending on the part-of-speech (POS) of the words. Based on these conditions, the probability boosting depends on the context, and the unexpected appearance of previously-selected words can be suppressed.

With respect to the second approach, probability boosting depending on probability difference, one-by-one incrementing $C_{user-sel}(w_{n-1}, w_n)$ may be insufficient for some words and too much for other words. The appropriate number of incrementing of $C_{user-sel}(w_{n-1}, w_n)$ depends on the word and context of the word.

The user selects the word from the candidate is because the probability that the sentence includes the word is lower than the probability that the other sentence includes the word. Thus, in order to obtain the word next time, the probability that the sentence includes the word should be higher than the probability that the other sentence includes the word (the first sentence at the previous conversion).

Figure 4:
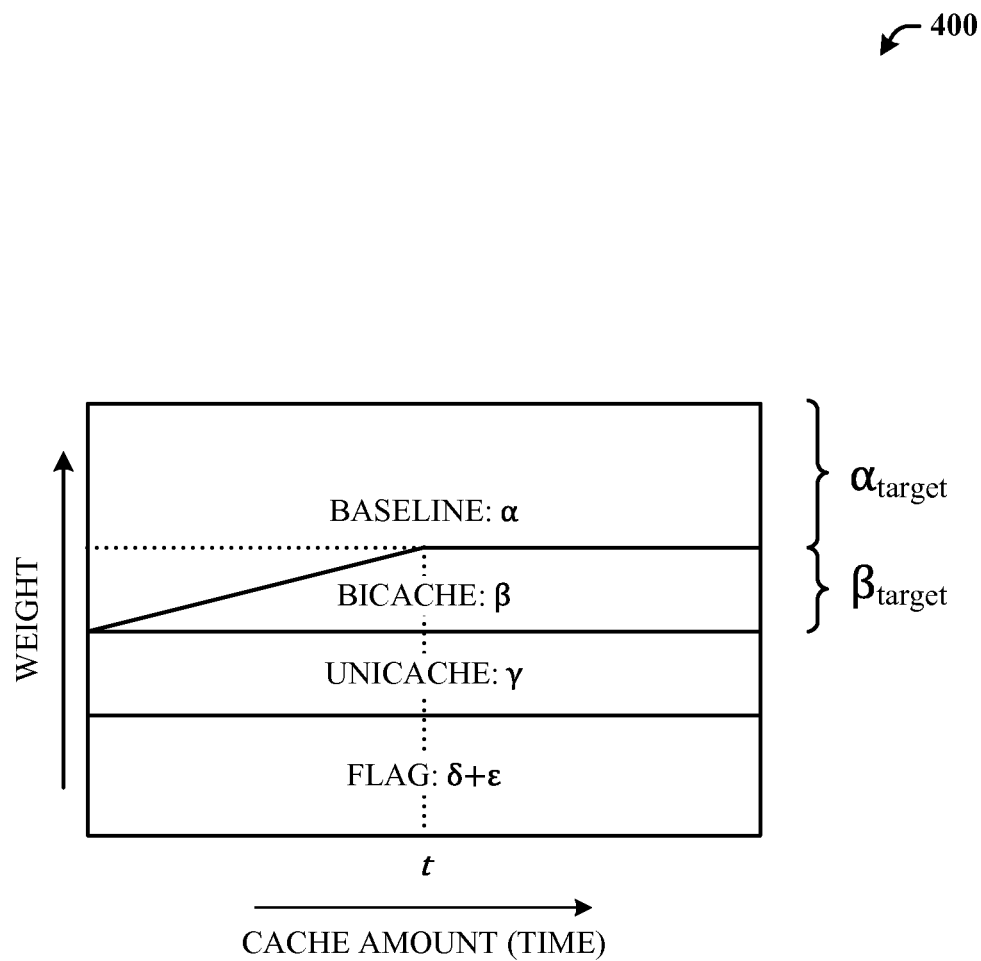
FIG. 4 illustrates a graph for a cache weight transition.

FIG. 4 illustrates a graph 400 for a cache weight transition. In an alternative embodiment, a cache weight transition is provided using a linear function and the cache weight is only for the bigram cache (bicache). The bigram cache weight depends on a unigram cache (unicache) amount of the preceding word. This means that the weight for bigram cache probability $P_{bicache}(w_i \mid w_{i-1})$ depends on $C_{unicache}(w_{i-1})$.

$$\omega = \begin{cases} \frac{1}{t} \cdot CacheAmount(w_{i-1}) & \text{if } CacheAmount < t \\ 1 & \text{Otherwise} \end{cases}$$

The flag weight $\delta+\epsilon$ is constant. The weight for the unigram cache is constant as well, but an offset value is added to the total unigram cache count to reduce the side-effects by the earlier cache.

$$P_{unicache}(w_i) = P_{unicache-smooth}(w_i) = \frac{C(w_i)}{\sum_k C(w_k) + UniCacheOffset}$$

$$P_{unicache-raw}(w_i) = \frac{C(w_i)}{\sum_k C(w_k)}$$

Flag-learning depends on the probability differences. The level of increase of a bigram flag changes depending on the amount of difference estimated between the first candidate and the selected candidate. The selected candidate becomes the first subsequent conversion result if the surrounding context is the same.

The following cases can be considered and the algorithm below covers all cases.

Case #1: $\{w_a, w_b, w_c\}_{after\ conversion} \rightarrow \{w_a, w_x, w_c\}_{after\ editing}$ Case #2: $\{w_a, w_{b1} \ldots w_{bm}, w_c\}_{after\ conversion} \rightarrow \{w_a, w_x, w_c\}_{after\ editing}$ Case #3: $\{w_a, w_b, w_c\}_{after\ conversion} \rightarrow \{w_a, w_{x1} \ldots w_{xn}, w_c\}_{after\ editing}$ Case #4: $\{w_a, w_{b1} \ldots w_{bm}, w_c\}_{after\ conversion} \rightarrow \{w_a, w_{x1} \ldots w_{xn}, w_c\}_{after\ editing}$ The following definitions are provided.

$P(w_b \mid w_a)$ is the word bigram probability before learning including baseline, cache, and flag probabilities.

$$P(w_b \mid w_a) = \alpha \cdot P_{baseline}(w_b \mid w_a) + \beta \cdot P_{cache}(w_b \mid w_a) + \gamma \cdot P_{cache}(w_b) + \delta \cdot P_{flag}(w_b \mid w_a) + \epsilon \cdot P_{flag}(w_b)$$

$P_L(w_b \mid w_a)$ is the word bigram probability after learning. The change of cache probabilities is ignored here for simplification, and only the flag probabilities change after learning.

$$P_L(w_b \mid w_a) = \alpha \cdot P_{baseline}(w_b \mid w_a) + \beta \cdot P_{cache}(w_b \mid w_a) + \gamma \cdot P_{cache}(w_b) + \delta \cdot P_{flag}(w_b \mid w_a)_{-1} + \epsilon \cdot P_{flag}(w_b)_{-1}$$

The flag counts for candidate words, which are the first candidates when a user selects an alternative candidate from the candidate list, are decremented by one after learning.

$$P_L(w_x \mid w_a) = \alpha \cdot P_{baseline}(w_x \mid w_a) + \beta \cdot P_{cache}(w_x \mid w_a) + \gamma \cdot P_{cache}(w_x) + \delta \cdot P_{flag}(w_x \mid w_a)_{+d} + \epsilon \cdot P_{flag}(w_x)_{+1}$$

The unigram flag counts for the corresponding candidate words, which candidate words are selected from the candidate list, are incremented by one. The bigram flag counts for the corresponding candidate words, which are selected from the candidate list, are incremented, the amount of increment to be determined.

With respect to the algorithm, before learning, the magnitude relation between the first candidate and the selected candidate is as follows, $$P(w_b \mid w_a) \cdot P(w_c \mid w_b) > P(w_x \mid w_a) \cdot P(w_c \mid w_x)$$

The magnitude after learning becomes, $$P_L(w_b|w_a) \cdot P_L(w_c|w_b) < P_L(w_x|w_a) \cdot P_L(w_c|w_x)$$

The probabilities $P_L(w_b|w_a) \cdot P_L(w_c|w_b)$ and $P(w_x|w_a) \cdot P(w_c|w_x)$ are known and how to calculate $P_L(w_x|w_a) \cdot P_L(w_c|w_x)$ is desired.

The change of probabilities by learning can be represented as an exponentiation (or power).

$$P_L(w_x|w_a) \cdot P_L(w_c|w_x) = [P(w_x|w_a) \cdot P(w_c|w_x)]^\phi$$

Therefore, $$P_L(w_b|w_a) \cdot P_L(w_c|w_b) < [P(w_x|w_a) \cdot P(w_c|w_x)]^\phi$$

Then $\phi$ can be calculated as, $$\varphi > \frac{\log[P(w_x|w_a) \cdot P(w_c|w_x)]}{\log[P_L(w_b|w_a) \cdot P_L(w_c|w_b)]}$$

Now, calculate $P_{flag}(w_x|w_a)_{+d}$ from $\phi$.

$$P_L(w_x|w_a) \cdot P_L(w_c|w_x) = [P(w_x|w_a) \cdot P(w_c|w_x)]^\phi = P(w_x|w_a)^\phi \cdot P(w_c|w_x)^\phi$$

If the below equalities are satisfied, the above equality is satisfied.

$$P_L(w_x|w_a) = P(w_x|w_a)^\phi \text{ and } P_L(w_c|w_x) = P(w_c|w_x)^\phi$$

Consider $P_L(w_x|w_a) = P(w_x|w_a)^\phi$.

$$P(w_x|w_a) = \alpha \cdot P_{baseline}(w_x|w_a) + \beta \cdot P_{cache}(w_x|w_a) + \gamma \cdot P_{cache}(w_x) + \delta \cdot P_{flag}(w_x|w_a) + \epsilon \cdot P_{flag}(w_x)$$

$$P_L(w_x|w_a) = \alpha \cdot P_{baseline}(w_x|w_a) + \beta \cdot P_{cache}(w_x|w_a) + \gamma \cdot P_{cache}(w_x) + \delta \cdot P_{flag}(w_x|w_a)_{+d} + \epsilon \cdot P_{flag}(w_x)_{+1}$$

$$\alpha \cdot P_{baseline}(w_x|w_a) + \beta \cdot P_{cache}(w_x|w_a) + \gamma \cdot P_{cache}(w_x) + \delta \cdot P_{flag}(w_x|w_a)_{+d} + \epsilon \cdot P_{flag}(w_x)_{+1} = [\alpha \cdot P_{baseline}(w_x|w_a) + \beta \cdot P_{cache}(w_x|w_a) + \gamma \cdot P_{cache}(w_x) + \delta \cdot P_{flag}(w_x|w_a) + \epsilon \cdot P_{flag}(w_x)]^\phi$$

$$\delta \cdot P_{flag}(w_x|w_a)_{+d} = [\alpha \cdot P_{baseline}(w_x|w_a) + \beta \cdot P_{cache}(w_x|w_a) + \gamma \cdot P_{cache}(w_x) + \delta \cdot P_{flag}(w_x|w_a) + \epsilon \cdot P_{flag}(w_x)]^\phi - [\alpha \cdot P_{baseline}(w_x|w_a) + \beta \cdot P_{cache}(w_x|w_a) + \gamma \cdot P_{cache}(w_x) + \epsilon \cdot P_{flag}(w_x)_{+1}]$$

$$P_{flag}(w_x|w_a)_{+d} = \frac{[\alpha \cdot P_{baseline}(w_x|w_a) + \beta \cdot P_{cache}(w_x|w_a) + \gamma \cdot P_{cache}(w_x) + \delta \cdot P_{flag}(w_x|w_a) + \varepsilon \cdot P_{flag}(w_x)]^\varphi}{\delta} - \frac{[\alpha \cdot P_{baseline}(w_x|w_a) + \beta \cdot P_{cache}(w_x|w_a) + \gamma \cdot P_{cache}(w_x) + \varepsilon \cdot P_{flag}(w_x)_{+1}]}{\delta}$$

The amount of increment d can be calculated based on the differences of probabilities, $$P_{flag}(w_x|w_a)_{+d} - P_{flag}(w_x|w_a)$$

The flag-learning probability is prepared by corresponding to the flag-count. The range of the flag-count can be 8, 16 or 32, for example. The more the number of counts, the more precise this algorithm works.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
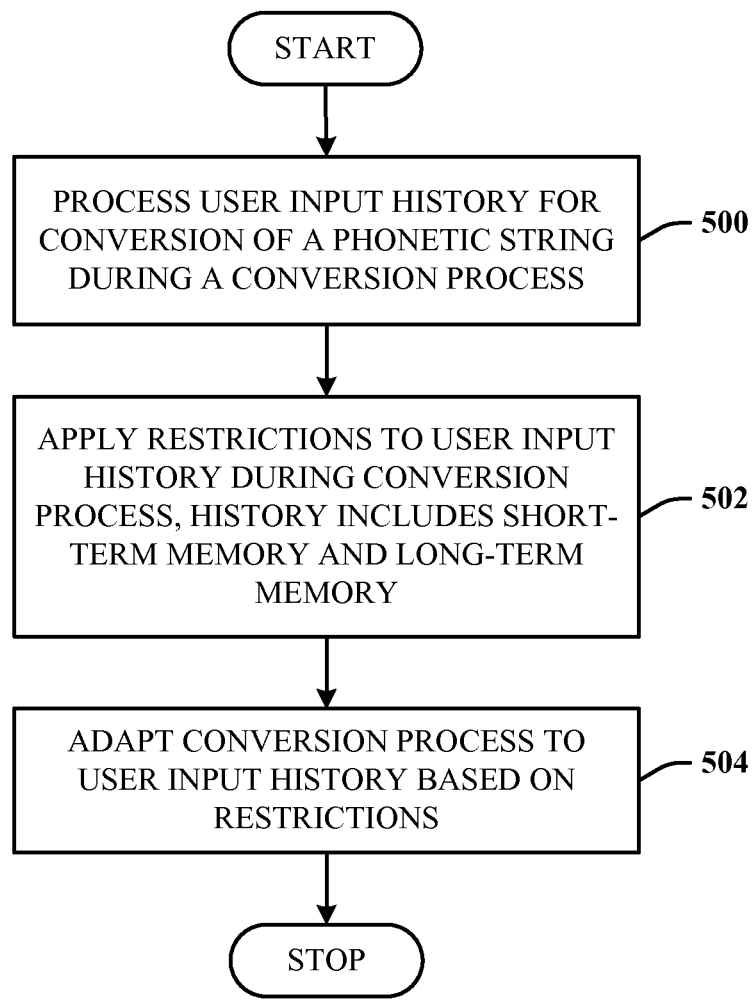
FIG. 5 illustrates a computer-implemented phonetic method.

FIG. 5 illustrates a computer-implemented phonetic method. At 500, the user input history is processed for conversion of a phonetic string during a conversion process. At 502, restrictions are applied to the user input history during the conversion process, the history including short-term memory and long-term memory. At 504, the conversion process is adapted to the user input history based on the restrictions.

Figure 6:
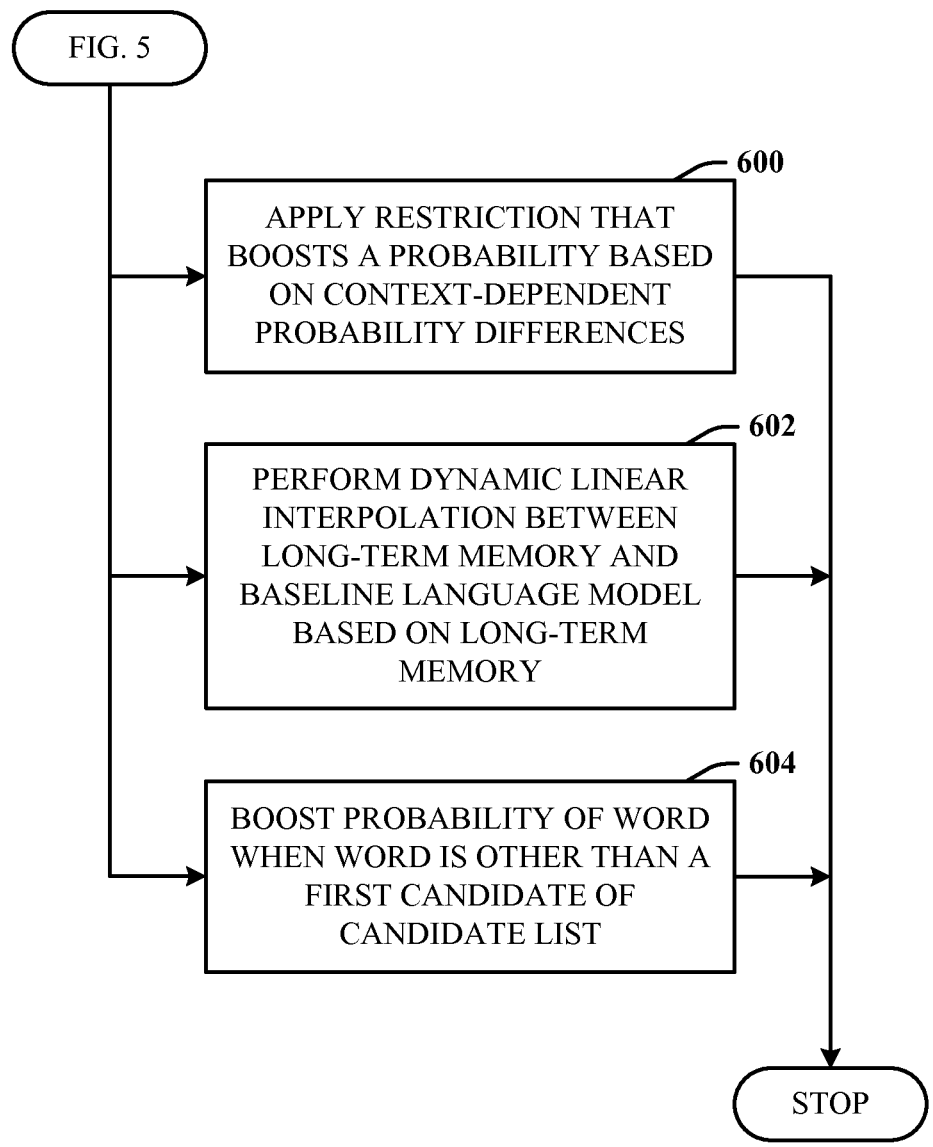
FIG. 6 illustrates additional aspects of the method of FIG. 5.

FIG. 6 illustrates additional aspects of the method of FIG. 5. At 600, a restriction is applied that boosts a probability based on context-dependent probability differences. At 602, dynamic linear interpolation is performed between long-term memory and a baseline language model based on the long-term memory. At 604, probability of a word is boosted when the word is other than a first candidate of a candidate list.

Figure 7:
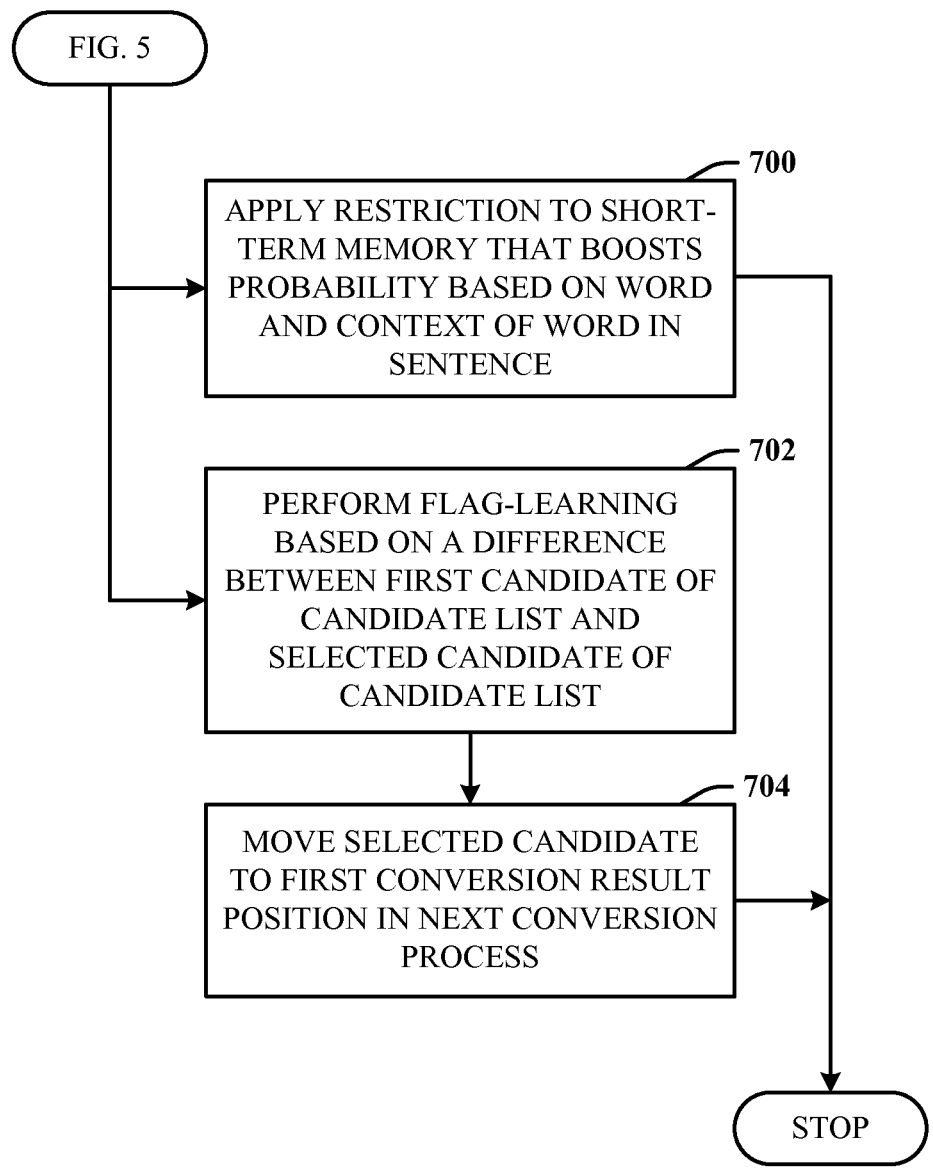
FIG. 7 illustrates additional aspects of the method of FIG. 5.

FIG. 7 illustrates additional aspects of the method of FIG. 5. At 700, a restriction is applied to the short-term memory that boosts a probability based on a word and a context of the word in a sentence. At 702, flag-learning is performed based on a difference between a first candidate of a candidate list and a selected candidate of the candidate list. At 704, the selected candidate is moved to a first conversion result position in a next conversion process.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
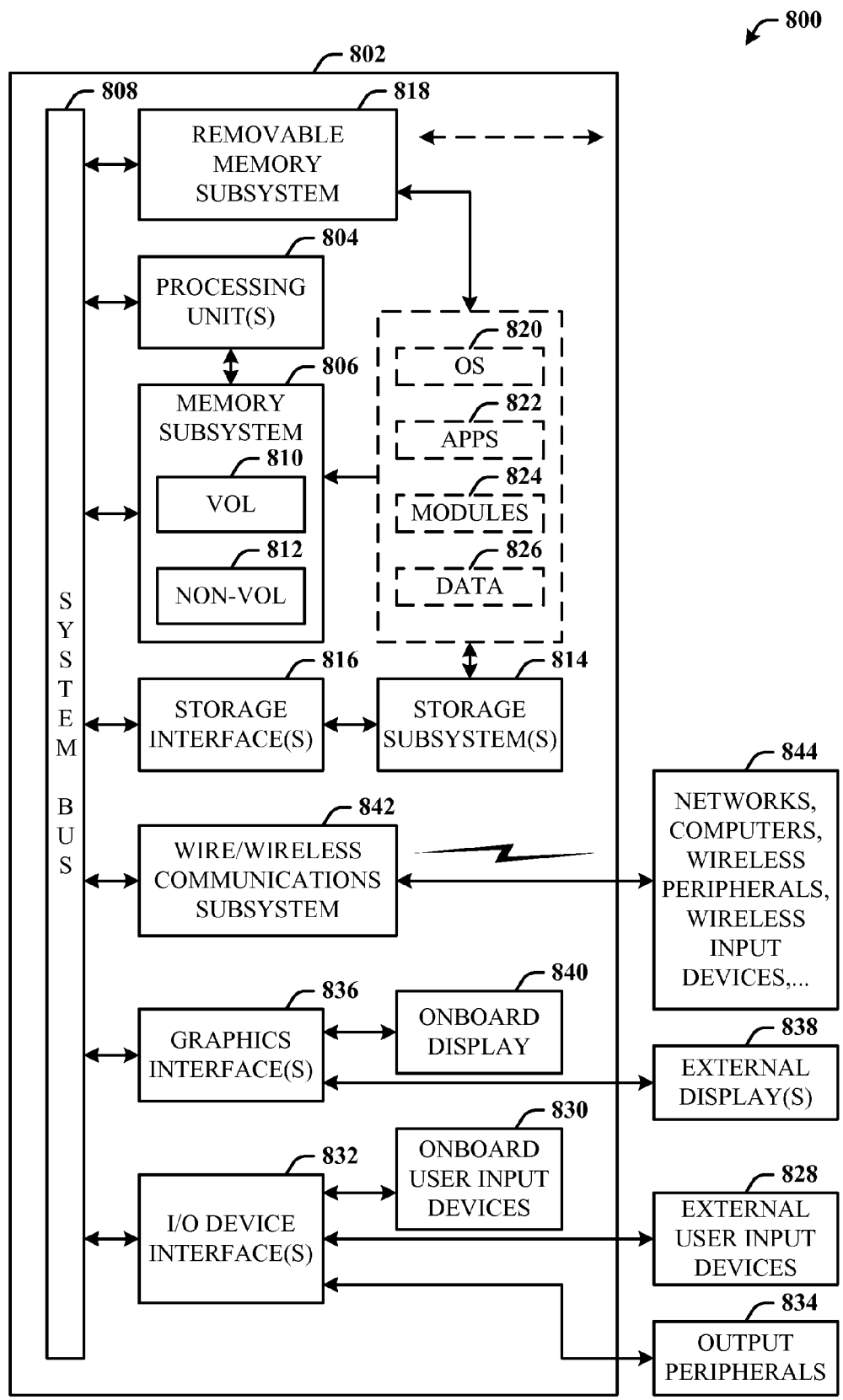
FIG. 8 illustrates a block diagram of a computing system operable to execute fast and stable adaptation for a statistical language model in accordance with the disclosed architecture.

Referring now to FIG. 8, there is illustrated a block diagram of a computing system 800 operable to execute fast and stable adaptation for a statistical language model in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the system 100 and components of FIG. 1, the system 200 and components of FIG. 2, the relationships represented by the graphs 300 and 400, and the methods represented by the flow charts of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented phonetic system, comprising:
a history component configured to process user input history for conversion of a phonetic string by a conversion process;
a restriction component configured to apply the restriction by boosting a probability based on the context-dependent probability differences;
an adaptation component configured to adapt the conversion process based on one or more restrictions applied to the user input history, which user input history comprises short-term memory as context-dependent probability differences and long-term memory as frequency of preceding context of a word, the adaptation component adapts the conversion process to the user input history to suppress unexpected word appearances during the conversion process; and
a microprocessor configured to execute computer-executable instructions associated with the history component, the restriction component, and the adaptation component.

2. The system of claim 1, further comprising a restriction component that applies a restriction to long-term memory by boosting a probability based on a context-dependent probability difference.

3. The system of claim 1, wherein the adaptation component performs dynamic linear interpolation between long-term memory and a baseline language model.

4. The system of claim 1, wherein the restriction boosts probability of a word when the word is other than a first candidate of a candidate list.

5. The system of claim 1, wherein the restriction applied to the short-term memory employs a context-sensitive short-term memory bigram probability.

6. The system of claim 1, wherein the restriction applied to the short-term memory boosts a probability based on a word and a context of the word in a sentence.

7. The system of claim 6, wherein the context includes a preceding context and a succeeding context relative to the word in the sentence.

8. The system of claim 1, wherein the adaptation component includes a learning algorithm that performs flag-learning based on a difference between a first candidate of a candidate list and a selected candidate of the candidate list, and moves the selected candidate to a first conversion result position in a next conversion process.

9. A computer-implemented phonetic system, comprising:
a history component configured to process user input history for conversion of a phonetic string during a conversion process;
a restriction component configured to apply restrictions to the user input history during the conversion process to suppress unexpected appearance of words, the restriction component applies a restriction that boosts a probability based on context-dependent probability differences, the history includes context-dependent probability difference as short-term memory and frequency of preceding context of a word as long-term memory;
an adaptation component configured to adapt the conversion process to the user input history based on the restrictions; and
a microprocessor that executes computer-executable instructions associated with the history component, the restriction component, and the adaptation component.

10. The system of claim 9, wherein the restriction component applies a restriction to the short-term memory that employs a context-sensitive short-term memory bigram probability and the long-term memory that boosts a probability based on a context-dependent probability difference.

11. The system of claim 9, wherein the adaptation component performs dynamic linear interpolation between long-term memory and a baseline language model.

12. The system of claim 9, wherein the restriction boosts probability of a word when the word is other than a first candidate of a candidate list.

13. The system of claim 9, wherein the restriction applied to the short-term memory boosts a probability based on a word and a context of the word in a sentence, the context includes a preceding context and a succeeding context relative to the word in the sentence.

14. The system of claim 9, wherein the adaptation component includes a learning algorithm that performs flag-learning based on a difference between a first candidate of a candidate list and a selected candidate of the candidate list, and moves the selected candidate to a first conversion result position in a next conversion process.

15. A computer-implemented phonetic method, performed by a computer system executing machine-readable instructions, the method comprising acts of:
processing user input history for conversion of a phonetic string during a conversion process;
applying restrictions to the user input history during the conversion process to suppress unexpected appearance of words, the history includes context-dependent probability difference as short-term memory and frequency of preceding context of a word as long-term memory, wherein a restriction is applied that boosts a probability based on the context-dependent probability differences; and
adapting the conversion process to the user input history based on the restrictions.

16. The method of claim 15, further comprising performing dynamic linear interpolation between long-term memory and a baseline language model.

17. The method of claim 15, further comprising boosting probability of a word when the word is other than a first candidate of a candidate list.

18. The method of claim 15, further comprising applying a restriction to the short-term memory that boosts a probability based on a word and a context of the word in a sentence.

19. The method of claim 18, wherein the context includes a preceding context and a succeeding context relative to the word in the sentence.

20. The method of claim 15, further comprising:
   performing flag-learning based on a difference between a first candidate of a candidate list and a selected candidate of the candidate list; and
   moving the selected candidate to a first conversion result position in a next conversion process.

\* \* \* \* \*

UNITED STATES PATENT AND TRADEMARK OFFICE
CERTIFICATE OF CORRECTION

| | | |
|---|---|---|
| PATENT NO. | : 8,798,983 B2 | Page 1 of 1 |
| APPLICATION NO. | : 12/413606 | |
| DATED | : August 5, 2014 | |
| INVENTOR(S) | : Katsutoshi Ohtsuki and Takashi Umeoka | |

It is certified that error appears in the above-identified patent and that said Letters Patent is hereby corrected as shown below:

In the Claims

Column 11, in claim 1, line 30, change "the" to "a".
Column 11, in claim 1, line 31, remove "the".
Column 11, in claim 2, line 46, change "further comprising a" to "wherein the".
Column 11, in claim 2, line 47, remove "that".
Column 11, in claim 2, line 47, change "to" to "to the".
Column 11, in claim 3, line 51, change "between" to "between the".

Signed and Sealed this
Twenty-fourth Day of March, 2015

Michelle K. Lee
*Director of the United States Patent and Trademark Office*